INVENTOR.
CARTER SINCLAIR
BY Merton D Morse
ATTORNEY

United States Patent Office 3,169,735
Patented Feb. 16, 1965

3,169,735
HOTBOX DETECTOR
Carter Sinclair, Waynesboro, Va., assignor to General Electric Company, a corporation of New York
Filed May 31, 1961, Ser. No. 113,906
11 Claims. (Cl. 246—169)

My invention relates to hotbox detectors and locators for railway vehicles and it has for its object to provide means for use in such systems to improve the positiveness and reliability of action thereof.

Figure 1:
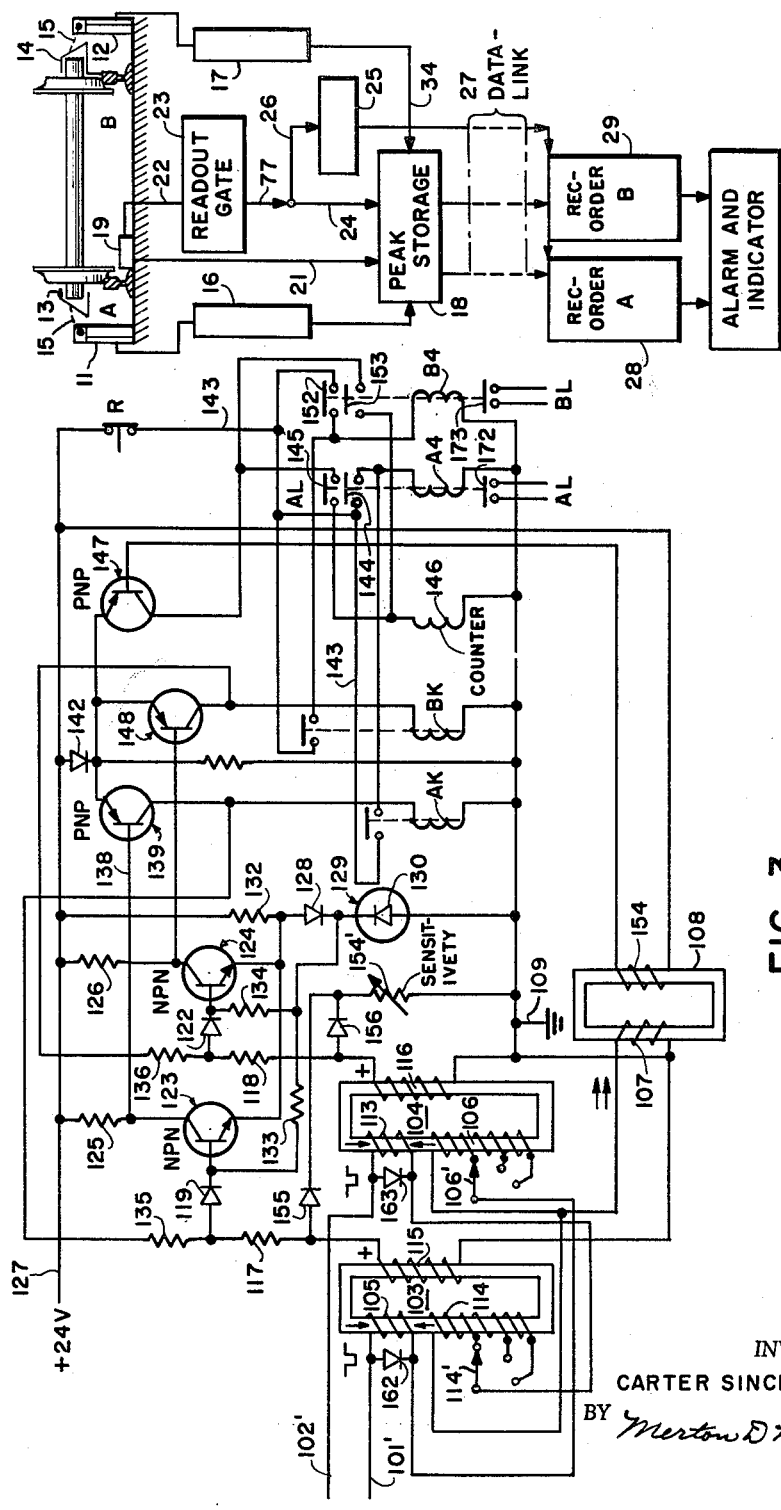
Figure 2:
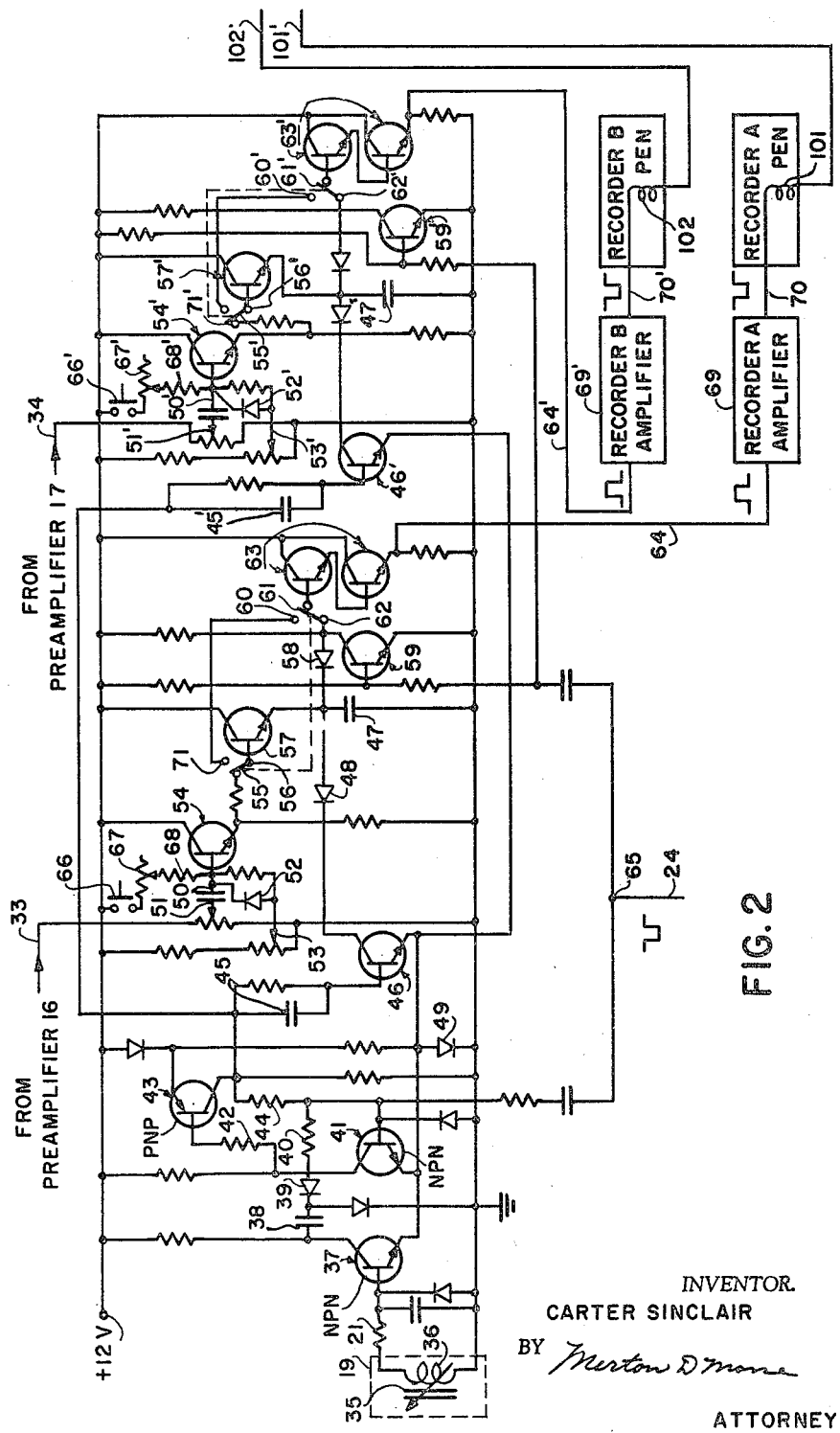

Application Serial No. 355, filed January 4, 1960, for William D. Cockrell, now abandoned and which is assigned to the assignee of my present application, discloses an improved system for detecting and locating hotboxes on railway vehicles. FIGS. 1 and 2 of the attached drawing are largely taken from that application. My invention has for one of its objects to provide improved means which may be used with systems such as that disclosed in said Cockrell application to produce desired signals in response to occurrence of a hotbox and to count the axles passing the hotbox detector thereafter, thereby to locate the hotbox.

An object of my invention is to provide a hotbox detector, which may be utilized with improved effectiveness with respect to the various types of bearings used on railroad vehicles, which permits more satisfactory adjustment and operation of the electronic equipment utilized for converting the signals received from the bearings to desired values suitable for operation of alarm signals, axle counters and the like, which permits greater facility in establishing desired reference voltages, biases, thresholds, feedback, etc., and in general affords altogether satisfactory operation in the detection of hotboxes.

One of the problems that arise in hotbox detectors arise from the fact that the temperatures and temperature variations to which the hotbox detector should, or should not, respond varies with the different types of bearings encountered on railway vehicles. For example, on a freight train, the locomotive, and possibly some cars, may utilize roller bearings in which a large percentage, for example 80 percent, of the maximum internal temperature appears at the exterior viewable surface of the bearing where it may be observed and measured by a hotbox detector. Other cars on the same train may employ friction babbitt bearings in which only a small percentage, for example, 20 percent, of the maximum internal temperature appears at the exterior viewable surface. Obviously, a defect producing heating warranting removal from service in a bearing of the latter type may be well within the range of normal operation of a bearing of the former type. Thus, a hotbox detector that should respond to an absolute temperature variation in a bearing of the latter type should not respond to an even greater variation in a bearing of the former type. Moreover, a temperature variation which might warrant removal of a bearing from service at one location of the vehicle might not warrant such action at another location of the vehicle.

Customarily, the two bearings on the same axle are alike and hotbox detectors are in use which respond to the difference in temperatures of such two bearings.

An object of my invention is to provide such a detector which may be readily adjusted to respond either to the difference in temperatures between the bearings on an axle or to variation in the ratio of the temperatures of the two bearings on an axle. Thus, since the temperature ranges are different in different bearings, the ratio of temperatures of the bearings on an axle, rather than absolute difference in bearing temperatures, becomes a more useful indicator of defectiveness in the different types of bearings.

In accord with my invention the pulses which are produced by each passing axle of a railway vehicle and the amplitudes of which are increased in accord with the temperatures of the axle bearings are supplied to two differential transformers, one for each side of the track, and a summing transformer.

These differential transformers have windings so proportioned and connected that an output voltage is produced that is proportional either to the difference in temperatures of bearings on opposite ends of the axle or to a desired ratio of temperatures established by the winding ratio of the transformer. If desired, this ratio may be adjustable.

These secondaries, or output windings, of these transformers are connected between a point of fixed potential and the control electrodes of respective transistors which are supplied with fixed operating potential, and fixed bias and threshold potentials, and are otherwise adjusted for stable operation. These transistors, when conductive, energize relays upon which voltage is developed which is supplied back to the transistors to reinforce the action of the transistors. The relays may be used to operate suitable devices and to render a counter responsive to pulses from the summing transformer, to which the above referred to pulses are supplied in aiding relation thereby to count the axles that pass after a hotbox has been detected.

Figure 5:
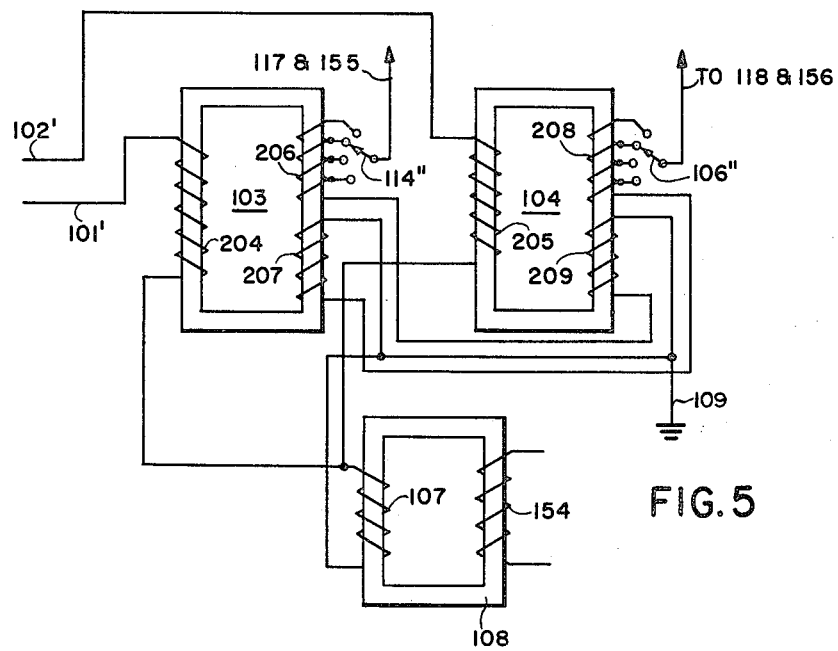
Figure 4:
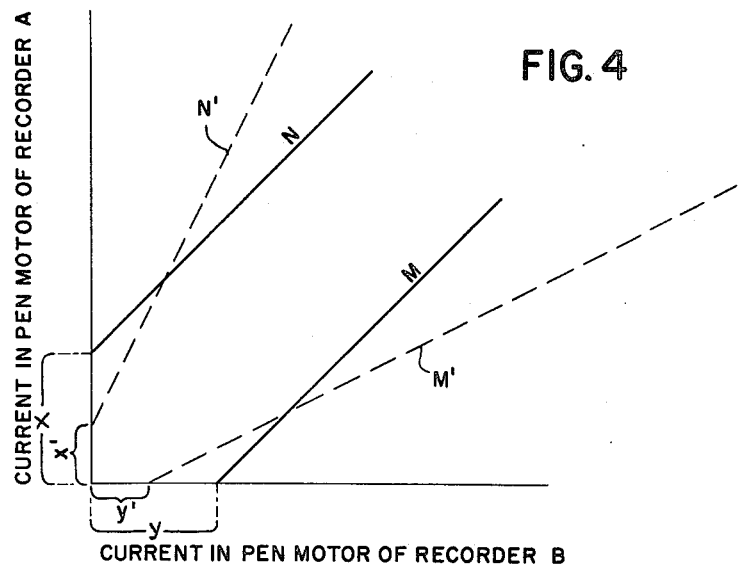

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawings in which FIG. 1 illustrates, in block diagram form, a hotbox detector in which my invention finds application; FIG. 2 illustrates the detailed circuits of the peak storage equipment represented by rectangle 18 in FIG. 1; and FIG. 3 is a continuation of the electrical circuit diagram of FIG. 2, and represents aspects of the improvements effected in accord with my invention; FIG. 4 illustrates certain characteristics pertaining to its operation; and FIG. 5 illustrates a modification.

Referring to the drawings, FIGS. 1 and 2 illustrate a hotbox detection system such as is described in the above referred to application of William D. Cockrell, modified in accord with my present invention.

FIG. 1 illustrates at 11 and 12 two infrared detectors arranged at a track side location. The detectors 11 and 12 may be any suitable infrared responsive device, such as bolometer elements connected in circuit with a compensating element which is not exposed to the incident infrared radiation for the purpose of balancing out all signals except those resulting from incident radiation as is well known in the art. Each of the detectors 11 and 12 is associated with a suitable optical system for viewing the journal boxes of passing railroad cars. The detector 11 is mounted at a suitable position to inspect journal boxes 13 on one side of the train while the detector 12 is mounted to inspect journal boxes 14 on the opposite side of the train. The optical axes 15 may be directed along the direction of the track to scan the side surface of the journal boxes 13 and 14 as the train passes. For the purpose of identifying the appropriate side of the train upon which a hot journal box is detected, one rail will hereinafter be arbitrarily designated the A rail and the other rail will be designated the B rail. Signals from the detectors 11 and 12 are amplified, respectively, in preamplifiers 16 and 17, and the amplified signals therefrom are applied to a peak storage circuit 18.

The peak storage circuit 18 is controlled by a presence detector 19 which senses the presence of a train axle at a predetermined position on the rails A and B and produces suitable electrical signals for the purposes hereinafter to be described. The presence detector 19 may also actuate enabling gates or mechanical shutters in the optical system of the detectors 11 and 12 if desired in the manner well known in the art.

The presence detector 19 produces a first output on lead 21 which enables the peak storage circuit 18 to be responsive to signals from the detectors 11 and 12 only during the period when the positions of the journal boxes 13 and 14, the temperatures of which it is desired to sense, are in the respective optical paths of the detectors. During this enabled interval the circuit 18 stores individual electrical quantities representative of the peak temperature sensed by the respective detectors 11 and 12. A second output signal from the presence detector 19 appears on line 22 and is applied to a readout gate circuit 23. The readout circuit 23 produces a gate signal in predetermined timed relation to the enabling signal on line 21 and the position of the train axle relative to the detectors 11 and 12 and this gate signal is applied to the storage circuit 18 by line 24 and to a timer circuit 25 via line 26. The readout gate signal on line 24 operates to transfer the peak magnitude quantities in the storage circuit 18 during a fixed time interval corresponding to the length of the gate signal. It is obvious that, if desired, the timer may be located at the recorder location and intiated by a quantity signal. These quantities may be transmitted by suitable information channels in a data link 27 which may constitute any suitable wire or space circuit to remote apparatus located aboard the train or at some stationary control center. Also transmitted to the remote location via the data link 27 is a signal from the timer 25.

The remote location may be provided with recorders 28 and 29 for recording the temperature signals derived from the storage circuit 18 representative of the temperature signals sensed by the detectors 11 and 12, respectively. Thus the record made by the recorder 28 indicates relative temperatures of the journal boxes passing on the side A of the railroad track and the recording made by recorder 29 will indicate the relative temperatures of the journal boxes on the B side of the railroad track. The temperature signals from the recorders 28 and 29 may then be applied to an alarm and indicator circuit 31 which indicates the existence and location of abnormally high temperature journal boxes on the passing train. Alternatively, the signals from the data link 27 may be applied directly to the alarm and indicator 31. The recorders 28 and 29 and the alarm and indicator circuit 31 are enabled by signals from the timer 25 and disabled a predetermined period after siganls from the timer 25 cease, thereby being operative only when a train is passing the presence detector 19.

The peak storage circuit 18 is shown schematically in FIG. 2 with input signals from preamplifier 16 applied at terminal 33 and signals from preamp 17 applied at terminal 34.

The input on line 21 from the presence detector 19 is indicated as being derived from a magnetic pickup device 35 which senses the presence of a train wheel by providing a suitably located air gap in a magnetic circuit which produces a flux change due to the reluctance change caused by the presence of the train wheel in the vicinity of the air gap. This flux change is detected by a coil 36 linking the magnetic path and thus producing an induced voltage signal on lead 21. This signal on lead 21 is applied to the base of an NPN transistor 37 which is normally nonconductive. A parallel circuit comprising a diode shunted by a capacitor and connected between the base of transistor 37 and the common ground of the circuit limits the voltage signal applied to the base of transistor 37. The collector of transistor 37 is coupled by capacitor 38, diode 39 and resistor 40, to the base of a normally conducting NPN transistor 41.

The collector of transistor 41 is coupled by resistor 42 to the base of a normally conducting PNP transistor 43 which has its collector coupled by resistor 44 to the base of transistor 41. The transistors 41 and 43 are thus regeneratively coupled such that both transistors will be conductive or nonconductive depending upon the nature of the signal applied to the base of transistor 41.

The collector of transistor 43 is coupled through an RC network 45 to the base of an NPN transistor 46. Transistor 46 is, therefore, controlled to be conductive whenever transistor 43 is conductive and vice versa. The transistor 46, when conductive, shunts a storage capacitor 47 by a circuit which is completed from the upper plate of capacitor 47 through a diode 48, the collector emitter path of transistor 46 and diode 49 to ground.

The input signal at terminal 33 received from preamplifier 16 is an impulse type signal, the amplitude of which is related to the infrared radiation emitted by the journal box which is in the field of view of the detector 11. This signal from terminal 33 is coupled by means of a sensitivity adjusting potentiometer 51 to a capacitor 50 which also has supplied thereto a voltage impressed on a diode 52 which has its anode at an adjustable D.C. voltage established by a potentiometer 53. The capacitor 50, therefore, applies a potential to the base of a transistor 54 which is a direct measure of the infrared radiation emitted by the journal box observed. The transistor 54 is an emitter follower which couples the potential applied to the base of transistor 54 to a switch 55 which is normally connected to a lower contact 56 connected to the base of transistor 57. The transistor 57 constitutes a low impedance source for charging the capacitor 47 to a potential corresponding to the signal detected in the base circuit of transistor 54.

The voltage on capacitor 47 is normally blocked by the nonconductive path through diode 58. The normally conducting transistor 59 maintains this condition until transistor 59 is cut off. The collector of transistor 59 is normally connected by a switch 61 connected to lower terminal 62 to the base input of a pair of Darlington connected transistors 63. The emitter output of the Darlington circuit 63 is applied via line 64 to a suitable signal circuit 69 for transmission to recorder A.

A peak signal circuit similar to that just described is provided for signals from preamplifier 17 applied to terminal 34. This circuit will not be described in detail since the components and connections are in all respects substantially the same as to that described for the detection of the peak value of the signal from preamplifier 16. The corresponding components for the circuit for detecting the peak value of the signal from preamplifier 17 are designated by primed reference numerals corresponding to the unprimed reference numerals of the previously described circuit. Thus RC circuit 45' couples the collector of transistor 43 to the base of transistor 46' and the terminal 34 is coupled through sensitivity adjusting potentiometer 51' to the capacitor 50' and thence to the capacitor 47' which is charged with the readout of the peak value through the Darlington circuit 63' to lead 64' where it is transmitted to the communication channel supplying recorder B.

In order that a count may be made of each axle, regardless of the radiation therefrom each time signals are gated from the peak storage circuit 18, it may be seen that signals so gated to any one data transmission channel are the sum of the signal applied to its associated input terminal 33 or 34 and the voltage appearing on the slider of the potentiometer 53 or 53'. This assures that even if the radiation from any one journal box is very low or is absent altogether a signal indicating that an axle has passed will be transmitted and counted.

The circuit of FIG. 2 is controlled by a gate signal applied to terminal 65 via conductor 24 from which it is coupled to the base of transistor 41 and the bases of transistors 59 and 59'. The gate signal applied to terminal 65 is a negative readout gate of approximately 10 milliseconds duration which occurs in response to a signal on line 22 from the presence detector 19. The relative timing of the two signals from presence detector 19 is such that the signal on lead 21 occurs a predetermined interval ahead of the gate signal at terminal 65 resulting from the occurrence of a presence signal on lead 22.

With the foregoing timing of the signals established by the presence detector of FIG. 1, and the readout gate 23 of FIG. 1 producing the negative pulse which appears on conductor 65 of FIG. 2, the operation of the circuit of FIG. 2 is as follows.

Upon the detection of the presence of a railroad car wheel the presence detector 19 produces a signal on lead 21 which makes transistor 37 conductive applying a negative signal to the base of transistor 41 which makes transistor 41 nonconductive. The termination of conduction in transistor 41 terminates conduction in transistor 43 since these transistors are regeneratively coupled to always be in the same conductive state. With transistor 43 nonductive, transistor 46 becomes nonconductive thereby unclamping capacitor 47 and permitting it to charge to the potential determined by the input signal to the base of transistor 54. The signal at the base of transistor 54 is determined by the peak value of the input signal at terminal 33 as modified by the sensitivity setting of potentiometer 51 and the signal established by the setting of potentiometer 53. During this charging interval the transistor 59 is conductive rendering diode 58 nonconductive and thus preventing the application of any signal to the input of the Darlington circuit 63.

Upon the occurrence of the negative gate at terminal 65, the transistor 59 becomes nonconductive permitting diode 58 to conduct, and thereby establishing at switch terminal 62 the positive potential of capacitor 47. This potential is applied by switch 61 to the input of the Darlington circuit 63 and is reproduced at output lead 64 for transmission to the recorder A.

At the end of the gate interval at terminal 65 the positive-going trailing edge of the waveform makes transistors 41, 43 and 59 conductive, thereby terminating the signal output on lead 64 and, since transistors 43 and 46 also become conductive, the charge on capacitor 47 is reduced to zero by discharging through the collector emitter path of transistor 46.

The operation of the circuit for storing the signals from preamplifier 17 applied at terminal 34 and reading these signals out on lead 64' is in all respects analogous to that just described.

By this operation the circuits just described apply positive going voltage signals, as shown by curves adjacent conductors 64 and 64', to the amplifiers represented by rectangles 69 and 69', which drive the recorder pen motors 101 and 102 with negative going current pulses, as shown by curves adjacent conductors 70 and 70'. These negative going pulses are of predetermined duration corresponding to the duration of the gate applied to terminal 65 and of amplitude determined by the signal representative of the radiation of the journal boxes appearing on the respective sides of a train axle. Thus the energy of the signal applied to the pen motors is a function solely of the radiation of the journal boxes which are being measured.

When a space transmission circuit is used between the detector location and the recorder location, the voltage to current conversion takes place at the recorder and alarm location, however, when a wire transmission circuit is used, the voltage to current amplifier is located at the detector and only the current signal is available to drive the pen motor and alarm at the recorder and alarm location.

Whenever the storage feature provided by the circuit of FIG. 2 is not required, or a continuous temperature signal is desired for continuous indications or calibration of the system, for example, the storage circuit can be bypassed by changing switches 55 and 61 to contact upper terminals 71 and 60, respectively. A calibration signal is provided by a pushbutton switch 66 which connects a voltage divider comprising adjustable resistor 67 and fixed resistor 68 connecting the base of transistor 54 to the positive 12 volt supply upon depression of switch 66. This circuit provides a selectable direct voltage at the base of transistor 54 corresponding to any predetermined signal as derived from the detector 11. A similar calibration circuit for the signal channel to the recorder B is provided by the circuit associated with pushbutton switch 66'.

The current signal on conductor 70, corresponding to conductor 64, for example, is supplied through the pen motor winding 101 of recorder A, conductor 101', winding 105 of transformer 103, winding 106 of transformer 104, input winding 107 of transformer 108, to ground at 109. The current signal on conductor 70', corresponding to conductor 64', is similarly supplied through pen motor winding 102 of recorder B, winding 113 of transformer 104, winding 114 of transformer 103, and input winding 107 of transformer 108, to ground at 109.

It will be observed from the direction of the arrows associated with windings 105 and 114 that these windings are wound differentially so that if the currents are equal in the two windings and the windings are equal, as when switch 114' is in its uppermost contact, no voltage is produced across the output winding 115. They are also so poled that if the current in winding 105, which corresponds to the temperature of the journal box of side A of the train, is greater than that in winding 114, then a positive voltage with respect to ground is generated at the upper terminal of secondary winding 115. On the other hand, if the current is greater in winding 114 then the voltage at the top of winding 115 is negative.

Transformer 104 operates in the same way but produces positive voltage with respect to ground at the upper terminal of winding 116 with current representing the journal boxes on side B, that is current representing voltage in conductor 64' is the greater.

However, the currents representing voltage in conductors 64 and 64' flow in the same direction in winding 107 of transformer 108 so that every axle produces actuating pulses in winding 154.

The upper terminals of windings 115 and 116 are connected through respective resistances 117 and 118, and diodes 119 and 122 to the base electrodes of respective NPN transistors 123 and 124. These transistors 123 and 124 have their collectors connected through respective resistors 125 and 126 to the positive 24 volt bus 127. They also have their emitters connected together and through diode 128 to the cathode terminal 129 of a Zener diode 130, the anode termial of which is grounded, thereby establishing a fixed reference potential between the two diodes 128 and 129.

The anode of the diode 128 is connected through resistances 132 to the positive bus 127 and the cathode of the diode is connected through respective resistances 133 and 134 to the base electrodes of the transistors 123 and 124.

Current normally flows through the resistance 132, diode 128 and Zener diode 130 whereby a potential across diode 128, which is small, establishes a fixed bias between the base electrodes and the emitters of the transistors.

Diodes 119 and 122, however, are normally nonconducting since their anodes are connected through respective resistances 135 and 136 to the upper terminals of relay windings AK and BK, which are normally deenergized and the lower terminals of which are grounded.

Should a positive voltage greater than the reference voltage established by Zener diode 130 appear at the upper terminal of winding 115 of differential transformer 103, this potential renders diode 119 conductive thereby driving the base electrode of transistor 123 positive and rendering transistor 123 conductive between its collector and emitter. The collector of transistor 123 is connected by conductor 138 to the base electrode PNP transistor 139, which now becomes conducting and thereby energizes the AK relay from the positive bus 127 through diode 142 and transistor 139. The voltage on the winding of the AK relay is supplied through resistance 135 to the anode of diode 119 thereby producing a positive feedback aiding the flow of current in diode 119, transistor 123 and in the winding of the AK relay.

Relay AK attracts its armature thereby energizing relay AL through a circuit which includes reset switch R, conductor 143, contacts of relay AK and the winding of relay AL. Relay AL attracts its armatures, closing a holding circuit for itself at its armature 144, and at its armature 145, closing a circuit for the actuating winding of counter 146 through diode 142, emitter and collector of PNP transistor 147, armature 145, and winding 146. Negative pulses from winding 154, for each axle passed, are supplied from this winding to the base electrode of PNP transistor 147 to be counted by the counter.

Similarly, had the upper terminal of winding 116 of transformer 104 become sufficiently positive, transistor 124 would have been rendered conductive thereby rendering transistor 148 conductive and energizing the winding of relay BK. Voltage in this relay BK is supplied back through resistance 136 and diode 122 to the base of transistor 124 thereby reinforcing the current in diode 122 and transistor 124 and supporting production of current in winding BK. This relay BK then attracts its armature closing a circuit through its armature contacts and reset switch R for the actuating winding of relay BL. This relay attracts its armatures closing a holding circuit for itself by armature 152 and closing a circuit for winding 146 of the counter at armature 153, this circuit including the transistor 147, to the base of which axle pulses are supplied from winding 154 of transformer 108.

It will thus be seen that at the upper terminals of windings 115 and 116 a voltage pulse appears as each axle having bearings of unequal temperature passes the hotbox detector illustrated in FIG. 1 and that these pulses are positive only on the winding 115 or 116 of the transformer associated with the side of the track in which the journal box has a temperature higher than that at the other side. If the temperatures are equal, the pulses are equal and nullify each other in transformers 103 and 104 but add in transformer 108.

These positive pulses cause actuation of transistors 123 and 139, or 124 and 148, dependent upon which end of the axle the journal box is the warmer. Actuation of either transistor 138 or 148 causes transistor 147 to become conducting. This transistor has its base electrode connected to the upper terminal of the secondary winding 154 of transformer 108, the other terminal of which is connected to the positive bus 127. Its emitter is connected to the same bias source as the emitters of transistors 139 and 148, and its collector is connected through armatures 145 and 153 of the AL and BL relays, and the winding 146 of the counter to ground.

Thus, as every axle passes, after a hotbox is detected, transistor 147 is rendered conducting and causes a pulse to be supplied from transformer 154 to the counter 146 through respective armatures of the AL or BL relay.

These relays, if desired, may be provided with additional armatures 172 and 173 which may be used to operate an alarm device to signal the operator that a hotbox has occurred, whereupon he may determine the location of the hotbox from the counter. The counter counts these pulses and thereby indicates the position in the train where the hotbox is located.

It will be observed that positive and reliable operation of desired sensitivity is had from the equipment as thus described. The sensitivity may be varied by variation of resistance 154', which is connected through respective diodes 155 and 156 across the respective windings 115 and 116. Once the transistors 123 and 124 have been rendered conductive by a positive output pulse from the transformers their output circuits are not affected by variation in resistance 154' to vary sensitivity.

The bias voltages on transistors 123 and 124 are fixed by diode 128 and associated resistors at fixed values that prevent leakage current through the transistors at any time.

Diodes 119 and 122 are nonconductive except when the potential on windings 115 or 116 is such as to call for conductivity of the associated transistor. At all other times the reverse bias is limited to a safe value; that determined by diode 128.

In addition, the use of fixed bias potentials on the base and emitters permits the use of the positive feedback as described through resistances 135 and 136. This operation greatly improves the positiveness and reliability of operation. When transistors 123 and 124 are nonconductive their base electrodes are connected through respective diodes 119 and 122, and respective resistors 135 and 136 to points at ground potential at the tops of the windings of the relays AK and BK. This helps to maintain these transistors nonconductive.

In like vein, when these transistors are rendered conductive the positive potential at the tops of relays AK and BK are supplied through the feedback resistors 135 and 136 to the bases of the diode further to assure their conductivity. The values of these resistances are such that the voltage on windings 115 and 116 must drop to less than half that required to turn the transistor on before the transistor becomes nonconductive. Thus once a transistor is turned on it latches on until the input positive voltage drops to less than half that required to turn it on.

Diodes 162 and 163 provide loading on differential transformers 103 and 104 when these transformers produce negative output voltages to about the same extent as these transformers are loaded by the output circuits when they produce positive output voltages. This prevents excessive voltage drops at any time in the circuits of recorders A and B.

FIG. 4 represents certain relationships between the currents in pen motors of recorders A and B which result in operation of the relays AK and BK. In FIG. 4 current in pen motor of recorder B is plotted as abscissa and current in pen motor of recorder A is plotted ordinates in equal units of current.

The area between lines N and M represents pen current values and relationships at which relays AK and BK are not energized. The area above, or to the left of, line N represents values and relationships of pen currents in recorders A and B for which relay AK is energized. The area below and to the right of line M represents values and relationships of pen currents A and B at which relay BK is energized.

Lines N and M are shown as parallel and intersecting the corresponding vertical and horizontal axes at current values represented by X and Y, respectively, on the drawing. These values are determined by the element 130 in FIG. 3, which may be a Zener diode, or other suitable element, and therefore X and Y are equal.

The lines N and M represent the conditions which exist when the two primaries on each transformer have equal turns. For a given value of current in the pen motor of recorder A the horizontal distance between lines N and M at the given value of A represents the range of currents in the pen motor of recorder B, which will not energize either relay AK or BK. Since lines N and M are parallel the range of B pen currents remains constant for all values of A pen currents. Thus the difference in currents in windings 115 and 116 when relays AK or BK operate is the same for roller bearings as for friction babbitt bearings even though a far wider range in temperatures of roller bearings may be tolerated.

The lines N' and M' represent the conditions which exist when the primary poled to energize relay AK or BK is opposed by a winding having twice as many turns poled to maintain the relay deenergized. For example, winding 114 may have twice as many turns as winding 105, i.e., when switch 114' is in its lower position, and winding 106 may have twice as many turns as winding 113, as when switch 106' is in its lower position. Thus the slope of line N' becomes 2:1 and the slope of line M' becomes 1:2. Under these conditions lines N' and M' diverge with increasing values of current in the pen motors. This means that it now becomes possible to actuate relay AK or BK on a difference which is variable and a function of the lesser pen current, that is, the current representing a properly operating bearing under the prevailing operating conditions. In other words, the hotter the normal operating temperatures of the bearing, the greater may be the difference in temperatures of the two bearings on an axle before the relays operate.

This is important because of the variety of bearing types, car load, and train speeds on axles passing a given detector. For example, the temperature of the viewable exterior surface of a roller type bearing is a much greater percentage of the maximum temperature within the bearing than for a babbitt type freight car bearing. Typical values might be 80 percent in the former case and 20 percent in the latter.

Thus, on an axle where the normal bearing shows a low visible temperature a given increase in visible temperature of the opposite bearing will indicate a high internal temperature indicative of trouble while the same temperature difference on an axle showing high visible temperature on the cooler bearing will represent normal variation between bearings. On this basis the ratio between the visible temperatures of the two bearings becomes a more valid criterion for determining an abnormal bearing than absolute difference.

For example, if we assume that a bearing operating at twice the temperature of the opposite bearing on the same axle, which is assumed to be normal, is at the acceptable limit, then using a turns ratio of 2:1 in the primaries of the differential transformer will allow the output of the differential transformer to go positive whenever the current in the winding poled to pick up the relay exceeds twice the current in the opposing winding. This ratio of bearing temperatures between a presumably normal identical bearing and the bearing in question is maintained over a wide range of conditions.

When using ratio rather than difference as a criterion, it is still desirable to maintain a certain minimum temperature difference below which no alarms will be actuated to provide for the effect of sun heating on one side of the train.

This threshold value may be as indicated at X' and Y' in FIG. 4 and may be determined by choice of the Zener diode 130 in FIG. 3 or other desired means for establishing a fixed threshold bias.

It will be understood that while I have mentioned a ratio of 2:1 as a possible windings turn ratio, the transformers may be provided with taps for adjustment of the ratio for best operation under the existing conditions.

The use of a differential transformer as outlined above permits independent control over both the slope of the lines defining the boundaries of the areas mentioned in FIG. 4 and the intersection of these lines with the vertical and horizontal axes. The slopes are determined by the ratio of the windings which may be selected by use of tapped windings, as indicated by tap selector switches 114' and 106' in FIG. 3. The intersections of these lines N' and M' and N and M with the vertical and horizontal axes is determined by the value of element 130, which may also be selected as by choice of Zener diodes. Thus with ratio detection, i.e., with the switches 114' and 106' in one of their lower positions the element 130 may be chosen to produce a lower bias as indicated at X' and Y' in FIG. 4.

Thus the transformers permit more realistic adjustment on the alarm conditions to recognize actual over-temperature bearings in the same train with bearings showing a higher normal visible temperature and thus greater differences in normal visible temperatures between bearings on the same axle.

In FIG. 5 is shown an arrangement of windings on differential transformers 103 and 104 in which each transformer has a single primary 204 and 205 connected, respectively, to the incoming conductors 101' and 102', and each transformer has opposed secondaries 206 and 207 on transformer 103, and 208 and 209 on transformer 104, thereby to produce the differential action described in connection with FIGS. 3 and 4. The variable ratio effect is also obtained by tap switches 114" and 106" associated with windings 206 and 208, respectively, as the fashion of switches 114' and 106' of FIG. 3.

Current in each primary 204 and 205 may be assumed to produce a positive pulse at the upper terminal of the associated secondary 206 or 208, but the intensity of that pulse is opposed by voltage induced in the 209 or 207 of the other transformer which is proportional to the intensity of the signal in the other primary. Thus all of the advantages of differential, and ratio action explained in connection with FIG. 3, are had with the arrangement of FIG. 5.

While I have shown a particular embodiment of my invention it will, of course, be understood that I do not wish to be limited thereto since various modifications, both in the circuit arrangements and the instrumentalities employed, may be made and I contemplate, by the appended claims, to cover any such modifications as fall within the true spirit and scope of my invention.

What I claim as new and desire to secure by Letters Patent of the United States is:

1. In a detector of railroad hotboxes, the combination of a pair of transformers, each having a primary winding connected to be supplied with current pulses of magnitude determined by the temperature of a bearing on the corresponding end of the same axle of a passing vehicle, a secondary winding, and a third winding, means to energize said third winding on each transformer in proportion to the intensity of currents in said primary of the other transformer, and said third winding being poled to oppose production of voltage in the secondary of the same transformer by currents in the primary thereof, whereby the voltage on said secondary has a value dependent on the difference in temperatures of said bearing.

2. In a detector of railroad hotboxes, the combination of a pair of transformers, each having a primary winding connected to be supplied with current pulses of magnitude determined by the temperature of a bearing on the corresponding end of the same axle of a passing vehicle, a secondary winding, and a third winding, means to energize said third winding on each transformer in proportion to the intensity of currents in said primary of the other transformer, and said third winding being poled to oppose production of voltage in the secondary of the same transformer by currents in the primary thereof, the ratio of turns of said third winding to the turns in one of said other windings being greater than one.

3. In a detector of railway bearings operating at abnormal temperatures where different types of bearings are employed on different axles, certain of which have normal operating temperatures in excess of the normal operating temperatures of bearings on other axles, the combination of a pair of transformers each having a primary winding, a secondary winding, and a third winding, a pair of signal devices, each signal device connected to a secondary winding and responsive to predetermined voltage on its corresponding one of said secondary windings, means to substantially simultaneously supply to each primary a pulse of intensity varying in accord with the temperature of bearings on the corresponding end of the vehicle axles, and means to supply to said third winding of each transformer in opposed relation to said prmary, a pulse varying in accord with the temperature of the bearing at the opposite end of said axles, said third winding being so related to said other windings of the same transformer that the difference in values of currents in said primaries required for operation of the respective signal device inceases as said normal operating bearing temperatures increase whereby said signal devices may respond to a predetermined difference in currents in said primaries produced by a normal low temperature operating bearing whereas it would not respond to the same difference in currents produced by a normal higher temperature operating bearing.

4. The combination, in a hotbox detector for railways, of a pair of transformers, one for each side of the railway, each having a primary and a secondary, means to supply to each primary pulses of intensity varying with the temperature of bearings on a corresponding side of a railway vehicle whereby voltages are produced in said secondaries, a pair of signal devices, means to operate each signal device in response to a predetermined voltage on the respective secondary, means to reduce the voltage in each secondary in proportion to the intensity of said pulses in the primary of the other transformer, and means to proportion the extent of said reduction to such values that a greater difference in intensity of pulses in said primaries is required to produce said predetermined voltage on either secondary when said primary currents are large, as produced by bearings operating normally at higher temperatures than when said currents are smaller as produced by bearings operating normally at lower temperatures.

5. In a detector and locator of railroad axle hotboxes, the combination of a pair of transformers, one for each side of a railway track, each transformer having two primary windings and a secondary winding, means responsive to passage of each end of each axle to pass a current pulse through a primary winding of a respective transformer, means individual to each end of the axles and responsive to abnormal temperature of the bearing box at the respective end to increase the intensity of the instant pulse in a corresponding primary winding of each transformer, said primary windings on each said transformer being so poled that when said pulses in the primary windings of each transformer are equal no potential appears on said secondary windings and when the pulse produced by a bearing on either end of an axle is greater than that produced by the bearing at the other end of the same axle a pulse of one polarity appears on the secondary corresponding to the respective end of the axle and a pulse of opposite polarity appears on the other secondary, a pulse responsive axle counter, and means responsive to said secondary potentials of one polarity to render said axle counter responsive to all said first mentioned pulses that occur thereafter to determine the location of the bearing box which produced the respective secondary potential.

6. In a detector of railway axle hotboxes, the combination of means on each side of the railway track to detect the temperature of the bearings on each axle and to substantially simultaneously produce a pulse of intensity determined by said temperatures, a pair of differential transformers and a summing transformer, said differential transformers each having a pair of primary windings and a seconday winding, means to pass each of said pulses through one primary of each differential transformer and through said summing transformer, said primaries being in opposed relation, whereby said secondaries have induced voltage of polarity corresponding to the end of the axle having the higher temperature and said summing transformer has an output pulse for every axle, a pair of relays, one for each differential transformer, said relays being connected to respond to voltage on the respective secondary of polarity representing a bearing of abnormal temperature, a counter, and means responsive to operation of either of said relays to supply said output pulses from said summing transformer to said counter.

7. The combination, in a detector and locator of bearing boxes of railway vehicles having abnormal temperatures, a pair of transformers each having a secondary winding, means responsive to the difference in temperature of the two bearing boxes on each vehicle axle passing the detector to produce a pulse of one polarity in one of said secondary windings and a pulse of opposite polarity in the other, the polarities of said pulses varying with the axle end on which the box having abnormal temperature appears, a pair of transistors each having a base electrode, an input electrode and an output electrode, a source of operating potential, having one terminal connected to said input electrodes of said transistors and to corresponding terminals of each of said windings, the other terminals of said windings being connected to corresponding base electrodes of said transistors, said output electrodes being connected to the opposite terminal of said source through respective resistors, means to maintain a fixed bias between said input electrodes poled to prevent leakage current therebetween in the absence of voltage on either winding due to abnormal temperature of a bearing, and a pair of relays, each connected to operate in response to variation in potential on a respective output electrode produced by a bearing box at abnormal temperature.

8. The combination, in a detector and locator of bearing boxes of railway vehicles having abnormal temperatures, a pair of transformers each having a secondary winding means responsive to the difference in temperature of the two bearing boxes on each vehicle axle passing the detector to produce a pulse of one polarity in one of said secondary windings and a pulse of opposite polarity in the other, the polarities of said pulses varying with the axle end on which the box having abnormal temperature appears, a pair of transistors each having a base electrode, an input electrode and an output electrode, a source of operating potential, having one terminal connected to said input electrodes of said transistors and to corresponding terminals of each of said windings, the other terminals of said windings being connected to corresponding base electrodes of said transistors, said output electrodes being connected to the opposite terminal of said source through respective resistors, means to maintain a fixed bias between said input electrodes poled to prevent leakage current therebetween in the absence of voltage on either winding due to abnormal temperature of a bearing, and a pair of relays, each connected to operate in response to variation in potential on a respective output electrode produced by a bearing box at abnormal temperatures, and means responsive to current variation in the respective relay produced by said abnormal temperature to increase the variation in potential between the input electrodes of the respective transistor.

9. The combination, in a hotbox detector, a pair of differential transformers, each transformer having a pair of input windings and an output winding, means responsive to each passing bearing on each axle end to produce a pulse in an input winding corresponding to the respective axle in each transformer, said input windings being so related that voltage appears at the output only in response to differences in magnitude of simultaneously applied pulses, means to vary the intensity of said pulses in accord with the temperature of bearings at respective axle ends, a pair of transistors each having a base, an emitter, and a collector, means to supply a constant bias voltage between one terminal of each of said output windings and said base electrodes, and a different bias voltage between said terminals and said emitter electrodes, said bias voltages being poled to prevent leakage current in said transistor, a pair of diodes, connections to supply voltage from each of said output windings to a respective base electrode through one of said diodes, said diodes being poled to become conductive only in response to voltage produced by a hotbox on a corresponding axle end thereby to render said transistor conductive, signal means responsive to conductivity of each transistor, and means responsive to current in said signal means to maintain said diode conductive until the intensity of the pulse which rendered it conductive is reduced to a value not greater than half that at which it became conductive.

10. The combination, in a hotbox detector for railways, of a pair of transformers, one for each side of the railway, each having a primary winding, a secondary winding, and a third winding, means to substantially simultaneously supply to each of said primary windings pulses of intensity varying with the temperature of bearings on a corresponding side of a railway vehicle, whereby voltages are produced in said secondary windings, and connections between said third windings whereby the voltage in each secondary winding is reduced in proportion to the current in the primary of the other transformer.

11. The combination, in a hotbox detector for railways, of a pair of transformers, one for each side of the railway, each having a primary winding, a secondary winding, and a third winding, means to substantially simultaneously supply to each of said primary windings, pulses of intensity varying with the temperature of bearings on a corresponding side of a railway vehicle, whereby voltages are produced in said secondary windings, and connections between said third windings whereby the voltage in each secondary winding is reduced in proportion to the current in the primary of the other transformer, a pair of signal devices, one corresponding to each transformer and each connected to operate in response to a voltage of greater than a predetermined magnitude on the respective secondary winding, said windings being so related that bearings operating normally at high temperature must produce currents of greater difference in amplitude to produce said predetermined voltage for operation of one of said signal devices than bearings operating normally at lower temperatures.

References Cited by the Examiner
UNITED STATES PATENTS 2,929,017   3/60   Seaton _____ 323—45 X
2,963,575  12/60   Pelino et al. _____ 246—169

OTHER REFERENCES

S.H.A. German application 1,031,338, printed June 4, 1958 (KL 20h 1).

LEO QUACKENBUSH, *Primary Examiner.*

LEO J. LEONNIG, *Examiner.*